United States Patent [19]

Erving et al.

[11] Patent Number: 5,805,579
[45] Date of Patent: Sep. 8, 1998

[54] SYMBOL SWITCHING OF CDMA CHANNELS

[75] Inventors: Richard Henry Erving, Piscataway; Diakoumis Parissis Gerakoulis, Dover; Robert Raymond Miller, II, Morris, all of N.J.

[73] Assignee: AT&T Corp, Middletown, N.J.

[21] Appl. No.: 643,720

[22] Filed: May 6, 1996

[51] Int. Cl.⁶ .................................................. H04J 13/00
[52] U.S. Cl. ......................... 370/320; 370/325; 370/342
[58] Field of Search .................... 370/320, 325, 370/342, 335, 323, 324, 315, 316, 441; 455/12.1, 13.1

[56] References Cited

U.S. PATENT DOCUMENTS

| | | |
|---|---|---|
| 4,491,947 | 1/1985 | Frank . |
| 5,239,545 | 8/1993 | Buchholz . |
| 5,365,590 | 11/1994 | Brame . |
| 5,424,862 | 6/1995 | Glynn ..................................... 359/172 |
| 5,481,561 | 1/1996 | Fang ....................................... 370/320 |
| 5,506,848 | 4/1996 | Drakopoulos et al. . |
| 5,604,920 | 2/1997 | Bertiger et al. ........................ 455/13.1 |

OTHER PUBLICATIONS

Bonuccelli, "A Fast Time Slot Assignment Algorithm for TDM Hierarchial Switching Systems", IEEE Transactions on Communications, Vo. 37, No. 8, Aug. 1989.

Stern, "Design Issues Relevant to Developing an Integrated Voice/Data Mobile Radio System", IEEE Transactions on Vehicular Technology, vol. 39, No. 4, Nov. 1990.

Acampora et al., "A Metropolitan Area Radio System Using Scanning Pencil Beams", IEEE Transactions on Communications, Vo. 39, No. 1, Jan. 1991.

Rose, "Rapid Optimal Scheduling for Time–Multiplex Switches Using a Cellular Automaton", IEEE Transactions on Connumications, Vo. 37, No. 5, May 1989.

Inukai, "An Efficient SS/TDMA Time Slot Assignment Algorithm", IEEE Transactions on Communications, vol. COM–27, No. 10, Oct. 1979.

Sriram et al., "Discrete–Time Analysis of Integrated Voice/Data Multiplexers With and Without Speech Activity Detectors", IEEE Journal on Selected Areas in Communications, vol. SAC–1, No. 6, Dec. 1983.

Rose et al., "The Performance of Random and Optimal Scheduling in a Time–Multiplex Switch", IEEE Transactions on Communications, vol. CDM–35, No. 8, Aug. 1987.

*Primary Examiner*—Min Jung
*Attorney, Agent, or Firm*—Alfred G. Steinmetz

[57] ABSTRACT

A digital switch included within a satellite, processes uplink beams and the included traffic channels at a symbol level instead at a bit level. In this system the switch performs as a repeater on the per user basis and as a switch at the beam level. Individual user signals (i.e., channels) are separated from the uplink beam and recombined into the appropriate downlink beam.

11 Claims, 3 Drawing Sheets

SYMBOL SWITCHING OF CDMA CHANNELS

FIELD OF THE INVENTION

This invention relates to the multi-point input-to-output switching of signals and in particular switching of spread spectrum signals (i.e., CDMA). Specifically the invention concerns the switching of CDMA signals at the symbol level to enable efficient use of space and weight limited switching systems such as with a satellite contained switch. It is very definitely concerned with switching occurring in a synchronous CDMA transmission system.

BACKGROUND OF THE INVENTION

Satellites have traditionally been used as transponders or "repeaters-in-the-sky" for signal beams in which all channels in the beam share a common destination. This arrangement has been referred to as a "bent-pipe" system which requires that any signal switching be ground based. This limits the overall utility of the satellite to deal with a plurality of throughput channels whose switch processing must be ground based. With switching ground based, two double hop transmissions (i.e. satellite-to-ground-to-satellite) must be traversed to couple satellite connected users together resulting in a large undesirable signal delay.

A "switch-in-the-sky" satellite allows both end users to be coupled directly to one another ( e.g., via satellite dishes). With switching located within the satellite, signal delay is reduced to one-half that of the bent-pipe system using ground based switching. This greatly enhances the satellite's ability to handle voice calls with acceptable quality.

A switch having desirable space and weight characteristics is essential to the "switch-in-the-sky" concept, otherwise a rather massive satellite switching architecture is required. Such a switch must include the capability to directly connect end users on a traffic channel. Since the traffic channels are bundled into beams, particularly in CDMA systems, traffic channels must be extracted from uplink beams and constituted into downlink beams in which all downlink channels with a common destination are combined into beams having the same destination.

Signal switching of digitized modulated signals is typically performed at the sampled waveform level which requires extensive processing circuitry to support the switching load. Even with the advances in VSLI technology that increase circuit density and support significant throughput, switching at the sampled waveform level requires a satellite processing size, weight and power constraint set that limit its capacity in any reasonably sized satellite. For example, a constant delay must be maintained for all digital bitstreams.

It is desirable from an economic and size/weight standpoint that a satellite signal processor provide the advantages of the "bent-pipe and switch-in-the-sky" systems, and yet avoid the disadvantages associated with each.

BRIEF SUMMARY OF THE INVENTION

A digital switching system having significant capacity without the size, weight and power requirements is provided as defined in claim 1.

In a particular illustrative embodiment, a digital switch included within a satellite, processes uplink beams and the included traffic channels at a symbol level instead at a sampled waveform level. In this system, the switch performs as a repeater on per user basis, and as a switch at the beam level. Individual user signals (i.e., channels) are separated from the uplink beam and recombined into the appropriate downlink beam.

Samples of the incoming waveform are taken. These samples are processed on a per-user basis to extract symbol information. The symbol information is then passed to a switching process for for routing to the appropriate output beam. The output basis processor then combines the user symbols and reconstructs a sampled waveform for transmission on the downlink.

DETAILED DESCRIPTION

Figure 1:
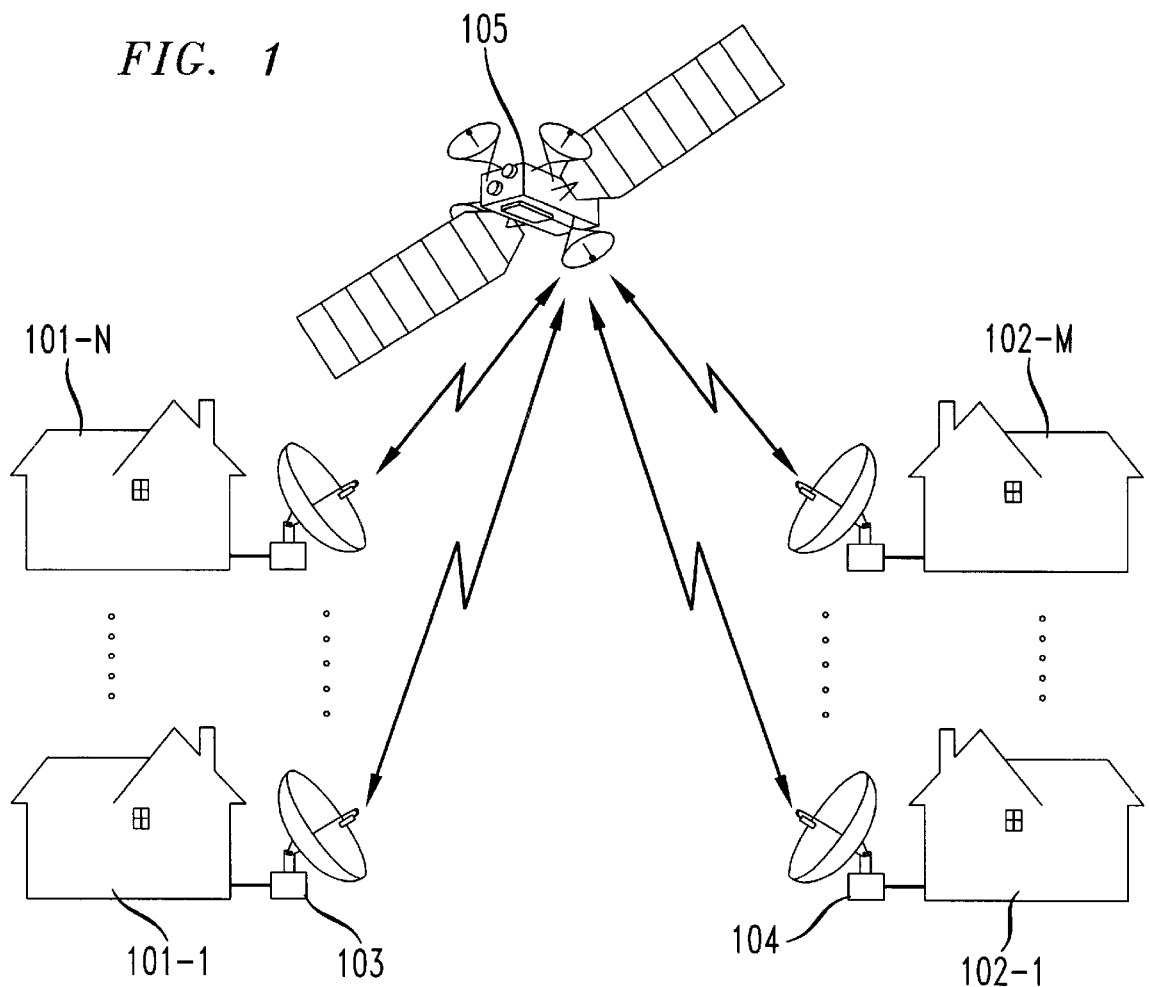
FIG. 1 is a schematic of a multi-pint-to-point communication system using a satellite to couple uplink and downlink CDMA beams with channels coupled from uplink beams into downlink beams having a destination in common with its assigned channels.

An illustrative point-to-point communication system coupling a transmitting user station to a receiving user station is shown schematically in FIG. 1. While illustratively depicting individual transmitting and receiving stations 101 and 102 the stations could be transmitting points and receiving points of a telephone system. These stations are fixed spatially/geographically as opposed to mobile. Further the stations could be bi-directional transceivers. Only a unidirection is shown for simplicity.

Station 101-1 includes a satellite dish antenna 103 which directs RF CDMA beam signals to a satellite 105. Station 102-1 receives RF CDMA beam signals from the satellite 105 via its accompanying satellite dish antenna 104. Each beam signal includes a plurality of bands. As shown the satellite receives RF CDMA beam signals from other transmitting stations 101-N and transmits RF CDMA beam signals to a plurality of receiving stations 102-N.

The beam signals each include a plurality of bands which include over head pilot, access and paging channels and a plurality of voice and data traffic channels. Synchronization is provided through the pilot channel and connections to the satellite are initiated through the access channel. The paging channel is used by the satellite to initiate a connection to the recipient user station.

The air interface between ground station and satellite includes a synchronous CDMA beam referenced from a fixed point. Adjacent beams are separated from one another by the application of spreading codes (e.g., Gold codes) and individual channels with the beam are each assigned and spread by a unique code from a set of orthogonal vectors. Synchronization is important in this application as a means of limiting multiple access interference which limits traffic capacity significantly. By synchronizing all beams with a common reference point the uplink beam may be demodulated down to the symbol level and then allow the original bit signal to be regenerated prior to the switched downlink transmission. The downlink beam is routed to a suitable destination beam and coded for downlink transmission.

The primary processes performed by the satellite on the incoming uplink CDMA beam are synchronization of the beam to some reference point and demodulation of the beam. In order to limit size and weight the timing and synchronization is not performed on each user channel but is rather dependent on a pool of timing and synchronization shared among the various beams to periodically analyze uplink users and provide timing information to the main processor.

Figure 2:
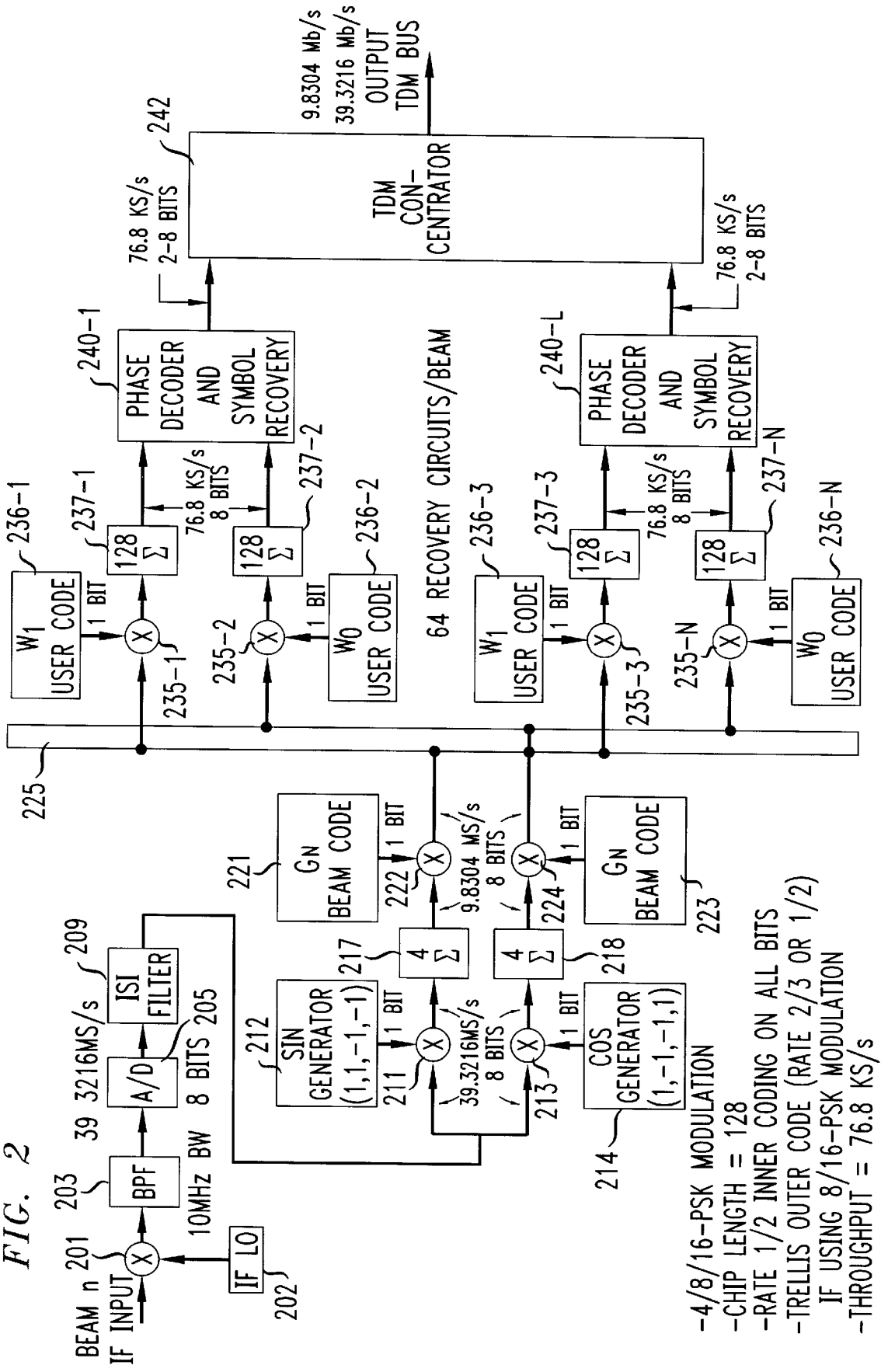
FIG. 2 is a schematic of uplink beam processing circuitry.

Demodulation of the uplink beam begins with a down conversion to IF in which each channel is applied to a mixer 201 excited by an IF local oscillator 202, as shown in FIG. 2. The mixed signal is applied, via a band pass filter 203, to an analog-to-digital converter 205 where the signal is digitized at a 4X oversample rate to produce an 8 bit resolution digital sample stream. The 8 bit digital domain symbol signal is applied to a root raised cosine ISI filter 209 which minimizes intersymbol interference in the signal stream. The signal is then applied to a quadrature demodulator comprising the one bit multipliers/mixers 211 and 213 and the exciting Sine and Cosine one bit generators 212 and 214, respectively. This demodulation process separates the in-phase (I) and quadrature-phase (Q) components of the signal. Since 4x oversampling is being used, in the illustrative example, only one bit is needed to represent the Sine and Cosine waveforms.

Multipliers 211 and 213 are followed by the integrators 217 and 218, respectively, and are used to convert the 4x oversampled input sample stream into a 1x symbol stream. This symbol stream now represents the sum of all users in the current beam, all interfering users in adjacent beams and noise in the channel.

In order to extract users from the beam GN beam codes supplied by beam code generators 221 and 223 are applied to the I and Q symbol stream bit-by-bit via application to multipliers 222 and 224 respectively. Applying this $G_N$ beam code to the symbol stream "whitens" the interference due to users in adjacent beams.

Output from the beam code process stage is applied to a bus 225 which applies the multiplier (222,224) output signals to traffic channel recovery units. The traffic channel recovery units each extract a baseband symbol stream for a particular user. The process involves despreading the incoming complex sample signal with the particular user's code, and detecting the phase of the resulting baseband signal. Each traffic channel recovery unit includes a multiplier/mixer 235-N excited by a Wi user orthogonal code generated by generator 236-N to apply the users particular orthogonal code bit-by-bit to the incoming complex sample stream. The output samples are accumulated by the summers 237-N and dumped at the end of the code. The output complex samples arriving at the baseband symbol rate are applied to the phase decoders 240-L, which convert the complex sample stream into a coded baseband symbol. These symbols are passed to a switch for routing to the destination beam. The first switch component is the TDM concentrator 242 which is connected to the TDM separator 302 of FIG. 3.

Figure 3:
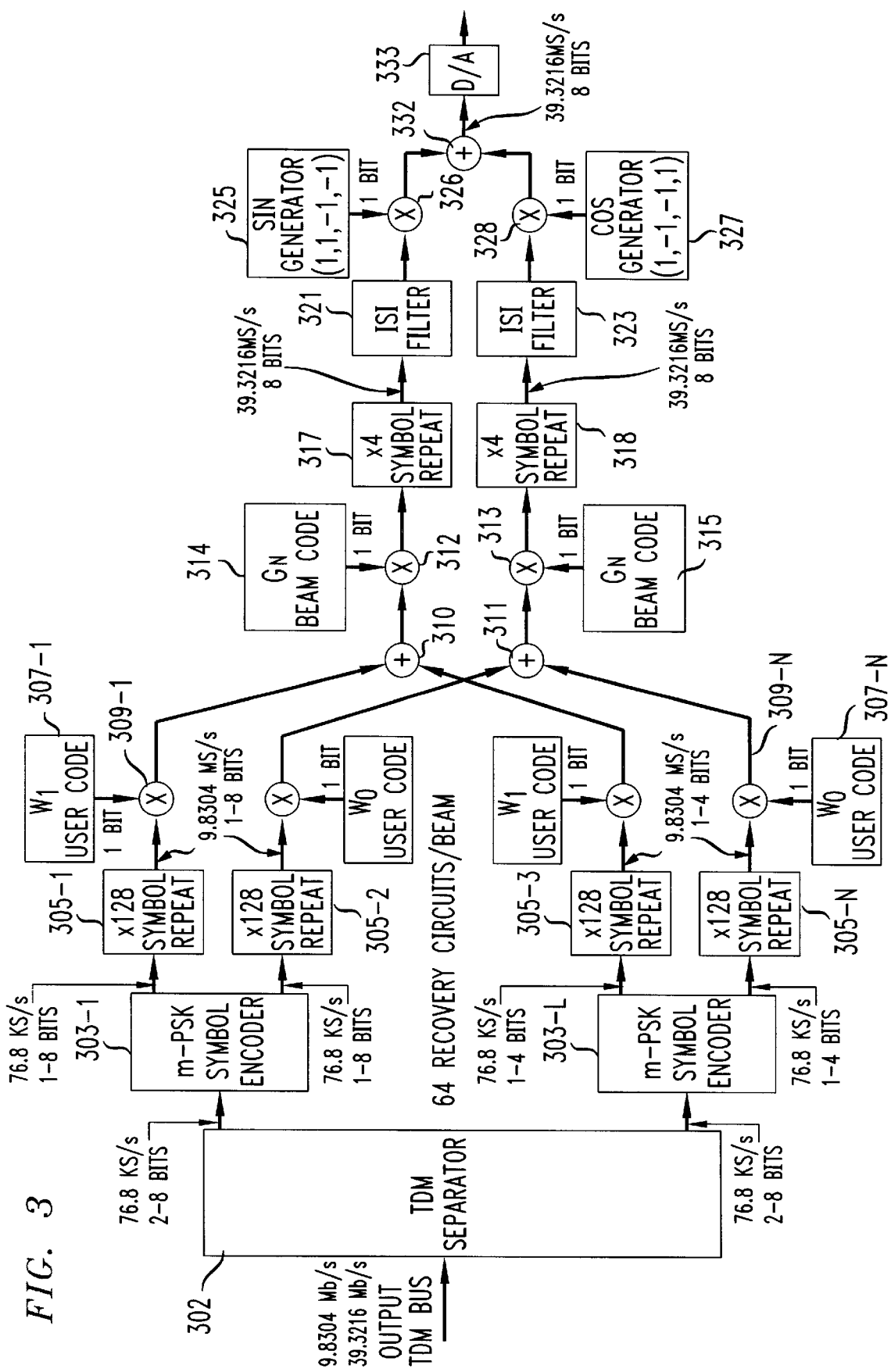
FIG. 3 is a schematic of downlink beam processing.

Downlink beam processing, as shown in FIG. 3, accepts individual baseband symbol streams and converts them to a properly modulated channel in the proper destination beam. The output of the TDM separator is applied to the symbol encoders 303-L which map symbols onto a complex modulation plane. The complex symbol is repeated at the chip rate by ×128 symbol repeaters 305-N so that the orthogonal spreading codes $W_i$ and $W_q$ of individual users may be applied from code generators 307-N to the multipliers 309-N. The results from the spreading with I and Q related codes are summed separately in summers 310 and 311 into combined I and Q sample streams. A beam code $G_N$ is supplied by generators 314 and 315 to the I and Q sample streams through multipliers 312 and 313, and then applied to x4 symbol repeaters 317 and 318 to provide oversampling head room for the filtering by the inter-symbol interference filters 321 and 323. These filters are of the same root raised cosine variety as in the uplink circuitry in FIG. 2, with one filter 321 for in-phase samples and one filter 323 for quadrature-phase samples.

The in-phase samples are multiplied by a signal supplied by the one bit Sine generator 325 in multiplier 326. Quadrature samples are multiplied by a one bit cosine signal from Cosine generator 327 in multiplier 328. These two signals are combined in summer 331 and applied for transmission to a transmitter on output lead 333, via summer 332.

The invention claimed is:

1. A satellite based switching system for coupling user channels in an uplink CDMA beam to a downlink CDMA beam; comprising:

means for receiving from a transmitting ground station the uplink CDMA beam and separating individual channels from the uplink beam by use of CDMA codes of individual channels included within the CDMA uplink beam;

means for extracting symbols from the uplink channels;

means for switching the uplink channels at a symbol level;

means for combining the symbol levels of uplink channels into downlink CDMA beams;

means for transmitting the downlink CDMA beams to a receiving ground station.

2. A switching system for coupling user channels in an incoming modulated beam to an outgoing modulated beam, each beam including a plurality of user channels, comprising:

means for sampling the incoming beam;

means for processing the samples on a per user basis to extract symbol information;

means for switching, by using CDMA codes of individual channels, the symbol information for routing to an appropriate output beam;

means for combining user symbols;

means for reconstructing a sampled waveform from combined user symbols for outgoing transmission as a beam.

3. A method of coupling user channels from incoming modulated beams to outgoing modulated beams, comprising the steps of:

sampling the incoming beam;

processing the samples on a per user basis to extract symbol information;

switching, by using CDMA codes of individual channels, the symbol information for routing to an appropriate output beam;

combining user symbols;

reconstructing a sampled waveform from combined user symbols for outgoing transmission as a beam.

4. A method of switching user channels in the sky from an uplink incoming modulated beam to an output downlink modulated beam, comprising the steps of:

generating symbols which represent information in each user channel;

switching symbols of each uplink user channel to a downlink beam, b using CDMA codes of individual channels, to a downlink beam having a destination in common with a predetermined destination of the user channel.

5. A switching system in the sky for switching uplink user channels extracted from uplink beams into downlink beams having a destination with a predetermined destination of aggregated uplink user channels forming the downlink beams; comprising:

means for sampling the uplink beams;

means for processing the samples on a per user basis to generate symbol information representing each user channel;

means for switching the symbol information to aggregate uplink user channels with a common destination predetermined, into downlink beams having a destination in common with the predetermined destinations of the user channels it contains, by using CDMA codes of individual channels.

6. A satellite based switching system for coupling user channels in an uplink CDMA beam to a downlink CDMA beam; comprising:

means for receiving from a transmitting ground station the uplink CDMA beam and separating individual channels from the uplink beam;

means for extracting symbols from the uplink channels;

means for switching the uplink channels at a symbol level;

means for combining the symbol levels of uplink channels into downlink CDMA beams, by including means for sampling a representation of the symbol, switch processing the sample and reconstituting the symbol following switch processing; and means for transmitting the downlink CDMA beams to a receiving ground station.

7. A satellite based switching system for coupling user channels in an uplink CDMA beam to a downlink CDMA beam; comprising:

means for receiving from a transmitting ground station the uplink CDMA beam and separating individual channels from the uplink beam;

means for extracting symbols from the uplink channels by modulating a channel by phase shift keying to obtain symbols of bit combinations;

means for switching the uplink channels at a symbol level;

means for combining the symbol levels of uplink channels into downlink CDMA beams;

means for transmitting the downlink CDMA beams to a receiving ground station.

8. A method of switching user channels in the sky from an uplink incoming modulated beam to an output downlink modulated beam; comprising the steps of:

generating symbols which represent information in each user channel, by sampling an uplink incoming modulated beam and processing the samples on a per user basis to extract symbol information;

switching symbols of each uplink user channel to a downlink beam having a destination in common with a predetermined destination of the user channel.

9. A method of switching user channels in the sky from an uplink incoming modulated beam to an output downlink modulated beam; comprising the steps of:

generating symbols which represent information in each user channel;

switching symbols of each uplink user channel to a downlink beam having a destination in common with a predetermined destination of the user channel;

reconstructing a sampled waveform from the switched symbols for transmission in the downlink beam.

10. A method of switching user channels in the sky from an uplink incoming modulated beam to an output downlink modulated beam; comprising the steps of:

generating symbols which represent information in each user channel by generating symbols representing bit combinations by phase shift keying;

switching symbols of each uplink user channel to a downlink beam having a destination in common with a predetermined destination of the user channel.

11. A switching system in the sky for switching uplink user channels extracted from uplink beams into downlink beams having a destination with a predetermined destination of aggregated uplink user channels forming the downlink beams; comprising:

means for sampling the uplink beams;

means for processing the samples on a per user basis to generate symbol information representing each user channel;

means for separating individual channels from the uplink beams;

means for switching the symbol information to aggregate uplink user channels with a common destination predetermined, into downlink beams having a destination in common with the predetermined destinations of the user channels it contains; and including means for processing switching with samples of a symbol level and means for reconstituting symbols following switching.

* * * * *